United States Patent [19]

Souji et al.

[11] Patent Number: 4,980,839

[45] Date of Patent: Dec. 25, 1990

[54] METHOD FOR DETECTING ORIGINAL POSITION OF ROBOT ARM FOR ALIGNMENT

[75] Inventors: Kazuo Souji, Hirakata; Takashi Moriya, Kadoma, both of Japan

[73] Assignee: Matsushita Electric Industrial Co., Ltd., Kadoma, Japan

[21] Appl. No.: 305,686

[22] Filed: Feb. 3, 1989

[51] Int. Cl.⁵ .............................................. G06F 15/46
[52] U.S. Cl. ............................... 364/513; 318/568.22; 901/2; 901/11; 901/46
[58] Field of Search .................... 364/513; 318/568.22; 901/2, 11, 46

[56] References Cited

U.S. PATENT DOCUMENTS

| | | | |
|---|---|---|---|
| 4,362,977 | 12/1982 | Evans et al. | 364/513 X |
| 4,481,592 | 11/1984 | Jacobs et al. | 364/513 |
| 4,722,063 | 1/1988 | Yasukawa et al. | 364/513 |
| 4,725,965 | 2/1988 | Keenan | 364/513 |
| 4,757,458 | 7/1988 | Takemoto et al. | 364/513 |
| 4,870,849 | 6/1987 | Okada et al. | 364/513 |

Primary Examiner—Allen MacDonald
Attorney, Agent, or Firm—Cushman, Darby & Cushman

[57] ABSTRACT

In a robot arm having a rotary encoder of incremental value type outputting signals including a signal (Z-signal) which is generated every one revolution of the rotary encoder and a rotary encoder of absolute value type, angles ($\Delta Z$, $\Delta D$) of the original positions of the respective rotary encoders with respect to an original position (E) of the robot arm are previously measured, then the arm is moved and is stopped at a position in which the Z-signal is generated, subsequently, an absolute position of the arm is detected on the basis of the angles ($\Delta Z$, $\Delta D$), and the angle between the arm and the original position (E) is calculated. The absolute position is detectable within one revolution of the rotary encoder of incremental type, and thereby an effective "return-to-origin operation" of the arm is accomplished.

3 Claims, 9 Drawing Sheets

METHOD FOR DETECTING ORIGINAL POSITION OF ROBOT ARM FOR ALIGNMENT

FIELD OF THE INVENTION AND RELATED ART STATEMENT

1. Field of the Invention

The present invention relates generally to a method for detecting position of an arm of an industrial robot, and more particularly to a method for detecting an original position of the arm.

2. Description of the Related Art

In operation of an industrial robot having plural arms, an original position of each arm is situated at a predetermined position, and the arm is shifted to the original position prior to "teaching" of a program or operation of the program to the robot so that an actual position of the arm conforms accurately with a position indicated by an output data of a control apparatus. The above-mentioned operation is designated as "return-to-origin". The original positions of the respective arms are situated at respective specific positions in order to maintain a high accuracy.

The "return-to-origin" operation of an arm of a conventional articulated robot is elucidated hereinafter.

FIG. 1 is a side view of the articulated robot. Referring to FIG. 1, an arm 1 is pivotally mounted on a bracket 5A with a shaft 1A. The bracket 5A is fixed on an end portion of the other arm 5. The shaft 1A is connected with a driving motor 3 through a reducing gear 2. A rotary encoder 4 of an incremental type is connected with the shaft of the motor 3.

FIG. 2 is a plan view of the above-mentioned robot, wherein a fan-shaped area surrounded by an alternate long and short dash line shows an operable range of the arm 1. The position of the arm 1 drawn by a dashed line B is an "original position" of the arm 1, and an original position detector 6 which is mounted on the arm 5 is activated by the arm 1 which is shifted to the original position in the return-to-origin operation.

The rotary encoder 4 coupled with the shaft of the motor 3 is rotated together with the shaft and output signals shown in FIG. 5(a), FIG. 5(b) and FIG. 5(c). The signal shown by FIG. 5(b) lags the signal shown by FIG. 5(a) by a phase angle of 90°. The signal shown by FIG. 5(c) is output every one revolution of the rotary encoder 4, and is designated as a "Z-signal".

When the original position detector 6 is activated and the Z-signal is output, revolution of the motor 3 is stopped by control of a control apparatus 20 in which the signals of the original position detector 6 and the Z-signal are inputted. Thus, the return-to-origin operation is completed.

In the above-mentioned return-to-origin operation, an operator must move the arm 1 to the original position shown by the dashed line B, and thus it is very troublesome and time-taking to accomplish the return-to-origin operation.

OBJECT AND SUMMARY OF THE INVENTION

An object of the present invention is to provide a method for detecting an original position of a robot arm for realizing return-to-origin operation with localized shift of the arm. In order to attain the object in the present invention, a difference between an original position of an arm and an original position of a position detecting means which is coupled with a driving motor is detected, and an absolute position of the arm is detected on the basis of the difference. Thus the return-to-origin operation of the arm is accomplished within one revolution of the driving motor.

The method for detecting the original position of the robot arm in accordance with the present invention comprises the steps of:

detecting a first value of dislocation between original position of the arm and an original position of an absolute position detecting means, detecting a second value of dislocation between the original position of the robot arm and a position whereat a signal is output every one revolution of a rotary encoder of incremental type, moving the robot arm to the position whereat a signal is output everyone revolution of the rotary encoder of incremental type, reading an absolute position of the arm by the absolute position detecting means, calculating a difference between the detected value of the absolute position detecting means and a sum of the first value of dislocation and the second value of dislocation, calculating a value representing a position of the arm corresponding to the value of the difference on the basis of a predetermined relation, and calculating an absolute position of the arm by summing the value representing the position of the arm and the second value of dislocation.

DESCRIPTION OF THE PREFERRED EMBODIMENT

Figure 1:
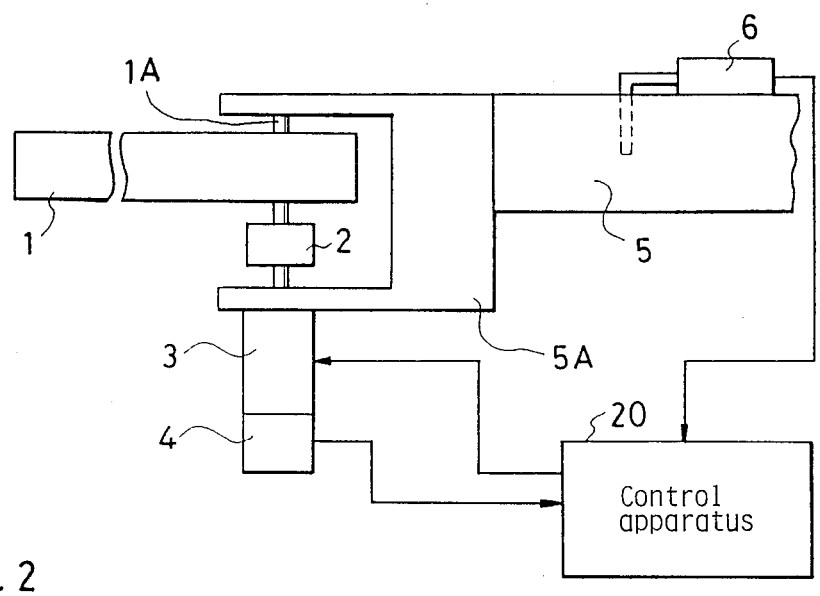
FIG. 1 is the side view of the robot in the conventional art.
Figure 2:
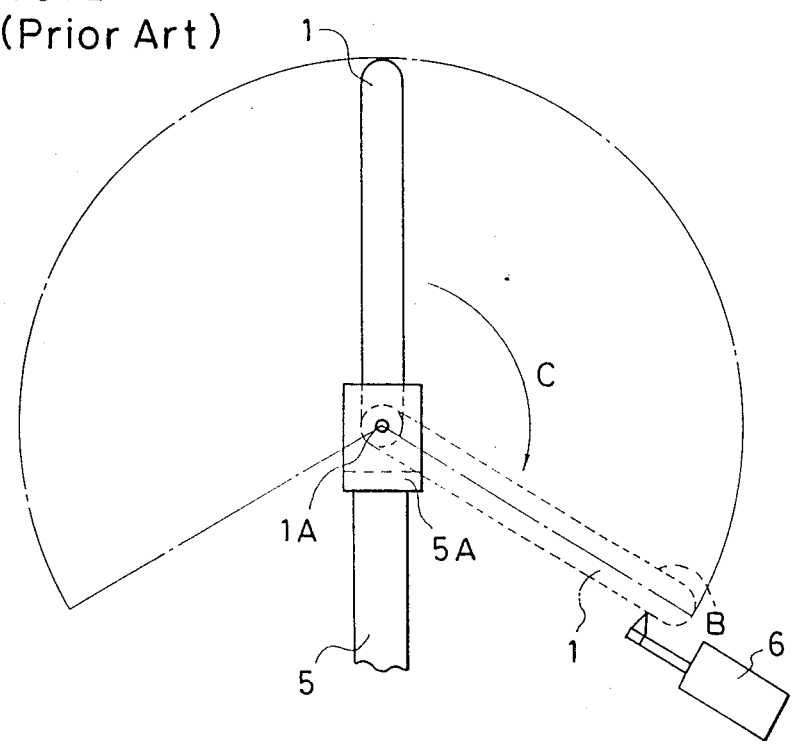
FIG. 2 is the plan view of the moving area of the robot arm 1 in the conventional art.
Figure 3:
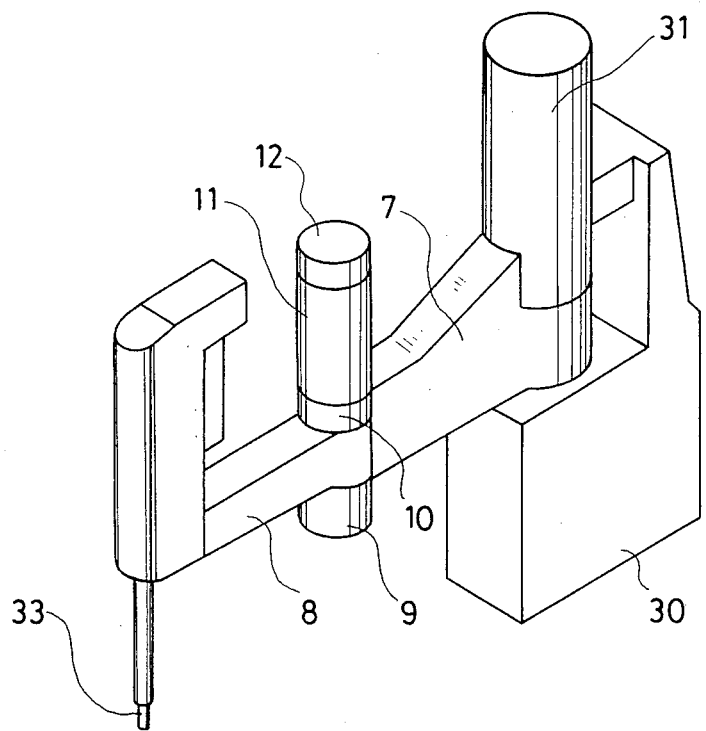
FIG. 3 is a perspective view of a robot in the present invention.

FIG. 3 is a perspective view of an articulated robot in accordance with the present invention. Referring to FIG. 3, a first arm 7 which is pivotally mounted at one end on a base 30 is driven by a motor 31. A second arm 8 is pivotally mounted at one end on the other end of the first arm 7, and is driven by a motor 11. A tool 33 is mounted on the other end portion of the second arm 8. Since the first arm 7 is controlled with the same method as the second arm 8, the original position detecting method of the arm is elucidated with respect to the second arm 8 hereafter.

Figure 4:
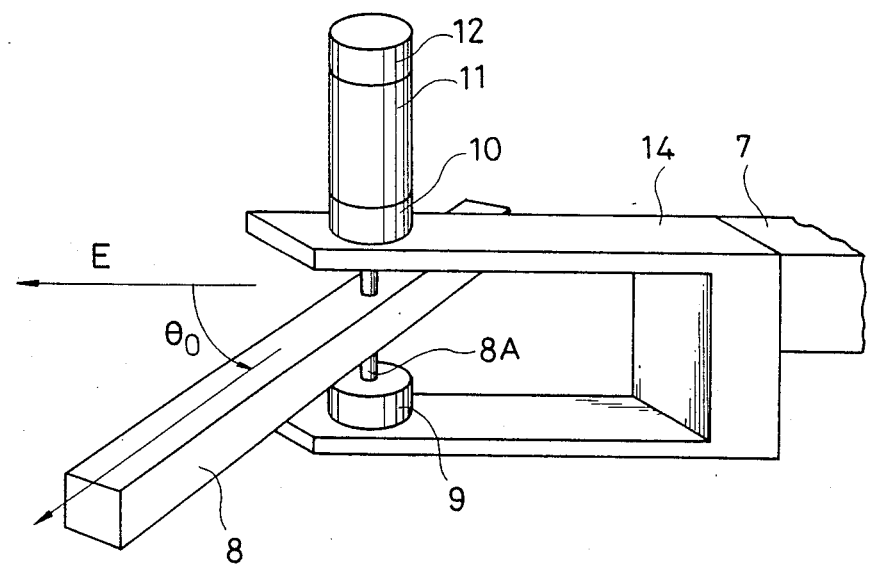
FIG. 4 is a perspective view of a second arm of the robot as shown in FIG. 3.

FIG. 4 is a perspective view for illustrating construction of the second arm 8. Referring to FIG. 4, the second arm 8 is pivotally mounted on a bracket 14 of the first arm 7 with a shaft 8A, and is driven by a motor 11 through a reducing gear 10. A rotary encoder 12 of an incremental type (hereinafter abbreviated as INC encoder) is directly coupled to a shaft of the motor 11 at the shaft of the INC encoder 12, and is rotated together with the shaft of the motor 11. A rotary encoder 9 of an absolute position type (hereinafter abbreviated as ABS encoder) is mounted on the shaft 8A, and an absolute value of a revolution angle of the shaft 8A is detected.

Figure 5:
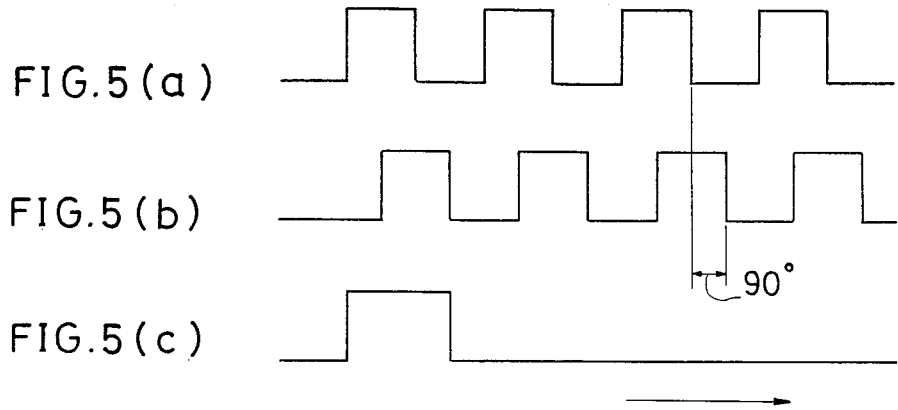
FIG. 5(a), FIG. 5(b) and FIG. 5(c) are waveform charts of output signals of a rotary encoder of incremental type.

FIG. 5(a), FIG. 5(b) and FIG. 5(c) are waveform charts of output signals of the INC encoder 12. Referring to these figures, the signal shown in FIG. 5(a) lags behind the signal shown by FIG. 5(b) by a phase angle of 90°. The signal shown by FIG. 5(c) is output every one revolution of the rotary encoder 12, and is designated as a "Z-signal". A direction of revolution of the INC encoder 12 is detectable with the convention method utilizing the phase difference between the signals as shown by FIG. 5(a) and FIG. 5(b). The signal shown by FIG. 5(c) is output at a specific position of a rotor of the INC encoder every one revolution thereof. A position of the rotor of the INC encoder in which the Z-signal is output is designated as a "reference position" of an INC encoder 12.

In the embodiment, for example, a reduction ratio of the reduction gear 10 is 1/18, and the arm 8 is rotated by 20° every one revolution of the motor 11. Moreover, the number of output pulses in one revolution of the INC encoder 12 is 360, and a minimum detecting angle of the ABS encoder is 0.5°, for example. Consequently, one output pulse is output every 20/360 degrees of revolution of the arm 8, and one Z-signal is output every 20° of revolution of the arm 8.

Referring to FIG. 4, a position of the arm 8 which is parallel to the first arm 7 as shown by an arrow E is designated as an original position 90 of the arm in the embodiment.

Figure 6:
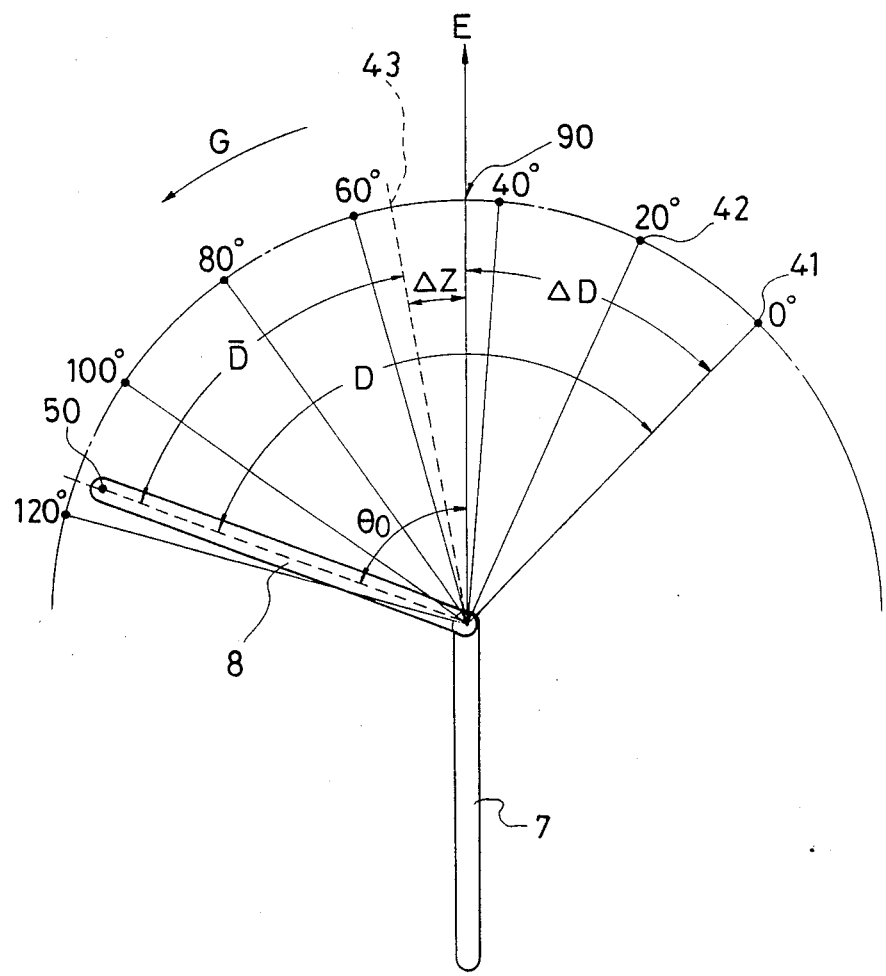
FIG. 6 is a plan view showing movement of the second arm.

FIG. 6 is a plan view of the arms 7 and 8. Referring to FIG. 6, it is assumed that the original position 41 of the ABS encoder 9 is located at a position which is rotated clockwise by $\Delta D$ degrees of angle (45° in the embodiment) from the original position 90, and Z-signal generating position 43 of the INC encoder is located at a position which is rotated counterclockwise by $\Delta Z$ degrees of angle (10° in the embodiment). Random arrangement of the IDS encoder and ABS encoder in assembly work of the robot results in forming these dislocated angles $\Delta D$ and $\Delta Z$.

Figure 8:
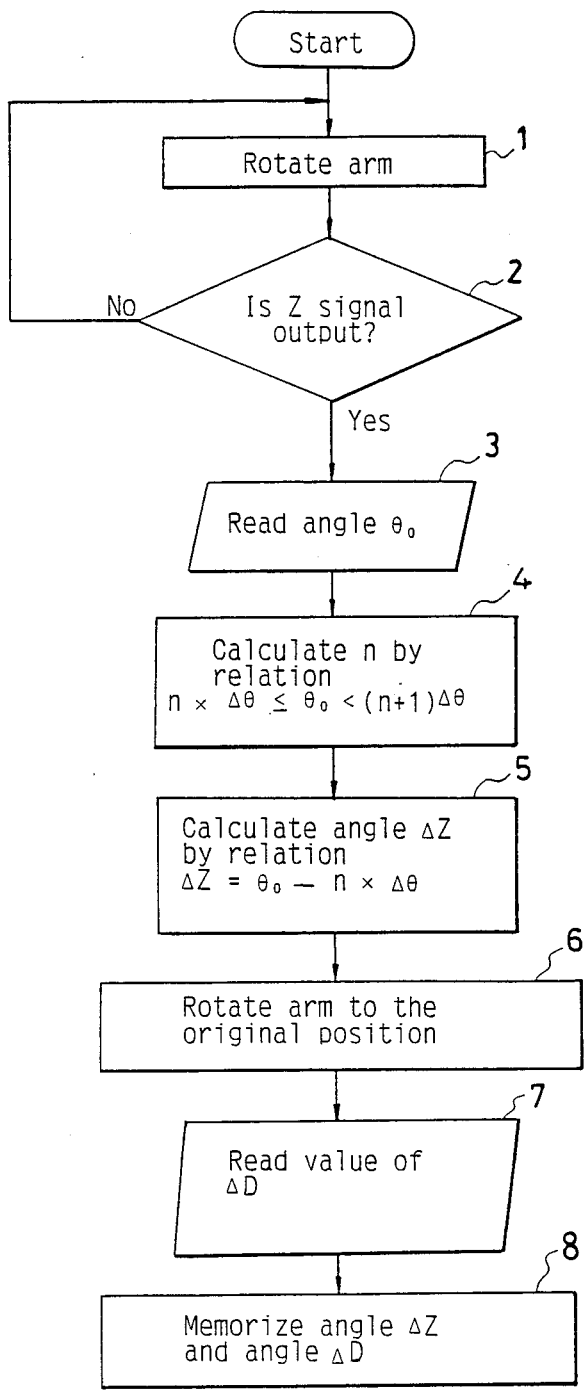
FIG. 8 is a flow chart of a process for calculating angles ΔZ and ΔD in the present invention.

The steps of the original position detecting method of the present invention is elucidated in reference with a flow chart as shown in FIG. 8.

Figure 7:
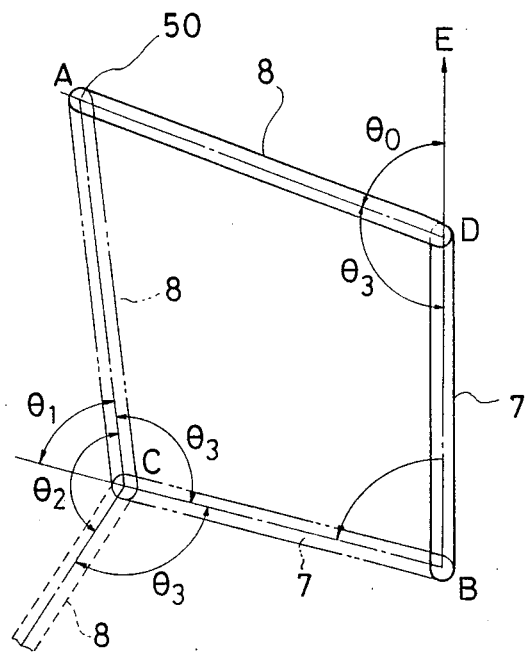
FIG. 7 is a plan view showing movement of a first arm and the second arm.

Firstly, an angle $\theta_0$, in FIG. 6, between the original position E and the arm 8 in which the tool 33 is positioned at a point 50, which is a Z-signal generating position of INC encoder 12, is calculated by the following method. In FIG. 7, the arm 7 and 8 are shifted to a position illustrated with an alternate long and short dash line by manual operation (step 1), and the tool 33 is also positioned at the point 50 in which the Z-signal is generated (step 2). Thus, a quadrangle ADBC is formed. In the above-mentioned operation, the arm 8 rotates $\theta_2$ degrees of angle, and the angle $\theta_2$ is detected by the INC encoder 12. In the quadrangle, since the angle $\theta_2$ is two times of an angle $\theta_1$ according to geometry, a triangle ABC is congruent with a triangle ADB, and thus the angle $\theta_1$ is equal to the angle $\theta_0$. Consequently, the angle $\theta_0$ is detectable by the detected value of the INC encoder 12 (step 3). The angle $\theta_0$ is 70° in the embodiment.

Subsequently, a value n is calculated by the relation (1) (step 4):

$$n \times \Delta\theta \leq \theta_0 < (n+1) \times \Delta\theta \quad (1),$$

where, the angle $\theta\Delta$ is a revolution angle of the arm 8 in one revolution of the motor 11, and in the embodiment the $\Delta\theta$ is 20°.

Furthermore, the angle $\Delta Z$ is calculated by the relation (2) (step 5):

$$\Delta Z = \theta_0 - n \times \Delta\theta \quad (2).$$

In the embodiment, the value n is 3, and therefore the angle $\Delta Z$ is 10°.

Then the arm is turned to the original position 90 (step 6). The angle $\Delta D$ is attained from an indication of the ADS encoder 9 by positioning the arm 8 on the original position 90 (step 7). The data of the angles $\Delta Z$ and $\Delta D$ are memorized in a memory (step 8).

The above-mentioned operation is accomplished after assembly of the robot. The angles $\Delta Z$ and $\Delta D$ are determined by mechanical arrangement of the INC encoder and the ABS encoder in the robot. Therefore, the angles $\Delta Z$ and $\Delta D$ remain unchanged after assembly of the robot. It is enough that the above-mentioned measurement of the angles $\Delta D$ and $\Delta Z$ are carried out in the fabricating process of the robot.

The return-to-origin operation in the user side of the robot is elucidated hereafter. Example of relation between a number of revolution N of the motor 11, a turned angle $\bar{\theta}$ of the arm 8 and a detected angle $\bar{D}$ of the ABS encoder in the embodiment are shown in a Table 1 whose contents are memorized in the control apparatus 20. In the Table 1, angles $\bar{\theta}$ and $\bar{D}$ are measured in a counter-clockwise direction as shown by an arrow G on the plan views of FIG. 6 and FIG. 9.

TABLE 1

| Number of revolution N | Turned angle ($\bar{\theta}$) (degree) | Detected angle ($\bar{D}$) (degree) |
| --- | --- | --- |
| 0 | 0 | 0 |
| 1 | 1 × $\Delta\theta$ | 0–20 |
| 2 | 2 × $\Delta\theta$ | 21–40 |
| 3 | 3 × $\Delta\theta$ | 41–60 |
| 4 | 4 × $\Delta\theta$ | 61–80 |
| 5 | 5 × $\Delta\theta$ | 81–100 |
| 6 | 6 × $\Delta\theta$ | 101–120 |
| 7 | 7 × $\Delta\theta$ | 121–140 |
| 8 | 8 × $\Delta\theta$ | 141–160 |
| 9 | 9 × $\Delta\theta$ | 161–180 |
| 10 | 10 × $\Delta\theta$ | 181–200 |
| 11 | 11 × $\Delta\theta$ | 201–220 |
| 12 | 12 × $\Delta\theta$ | 221–240 |
| 13 | 13 × $\Delta\theta$ | 241–260 |
| 14 | 14 × $\Delta\theta$ | 261–280 |
| 15 | 15 × $\Delta\theta$ | 281–300 |
| 16 | 16 × $\Delta\theta$ | 301–320 |
| 17 | 17 × $\Delta\theta$ | 321–340 |
| 18 | 18 × $\Delta\theta$ | 341–300 |

Figure 10:
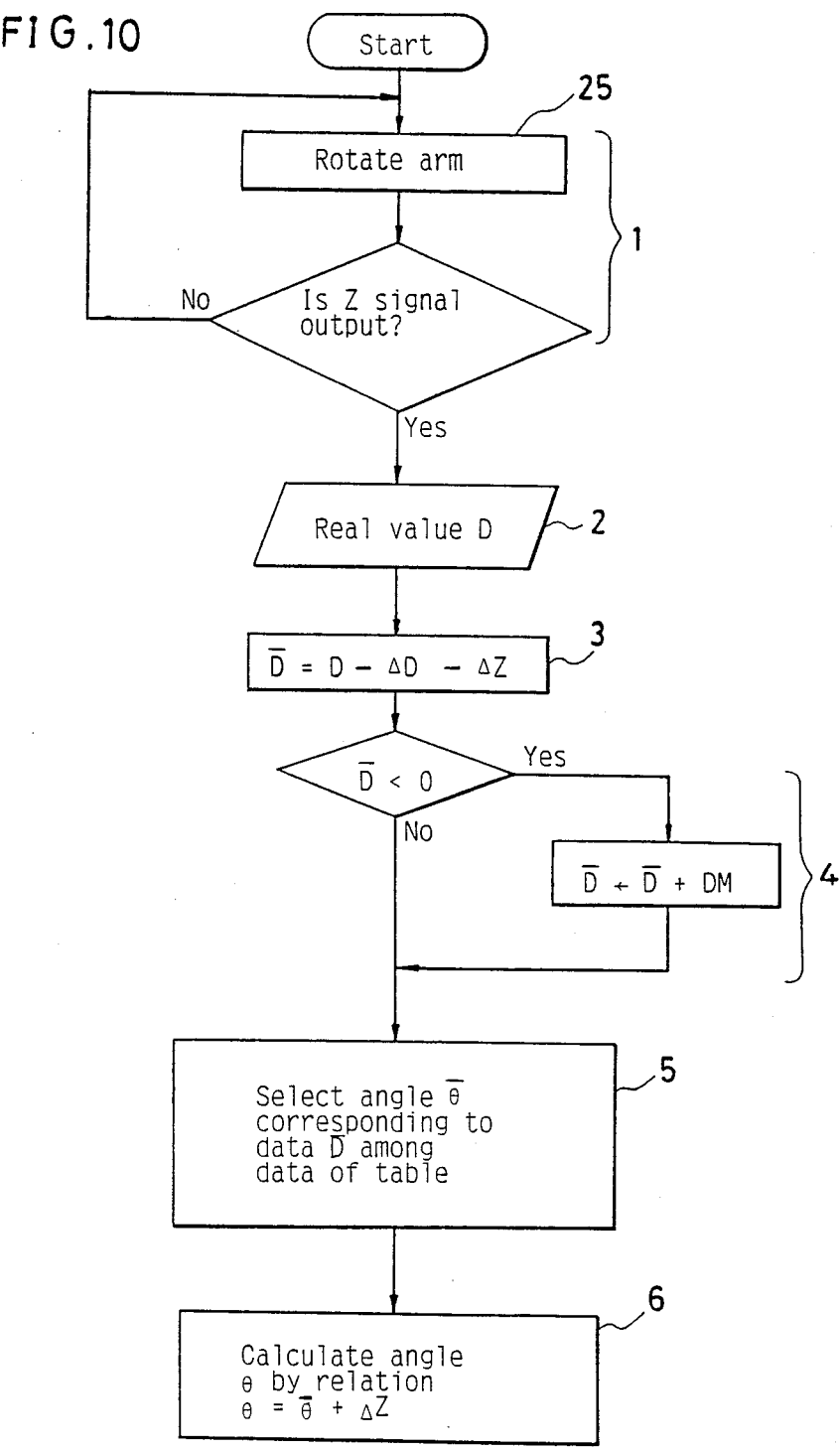
FIG. 10 is a flow chart of a process in the original position detecting method in the present invention.

FIG. 10 is a flow chart of the original position detecting method of the robot arm in the present invention.

Figure 9:
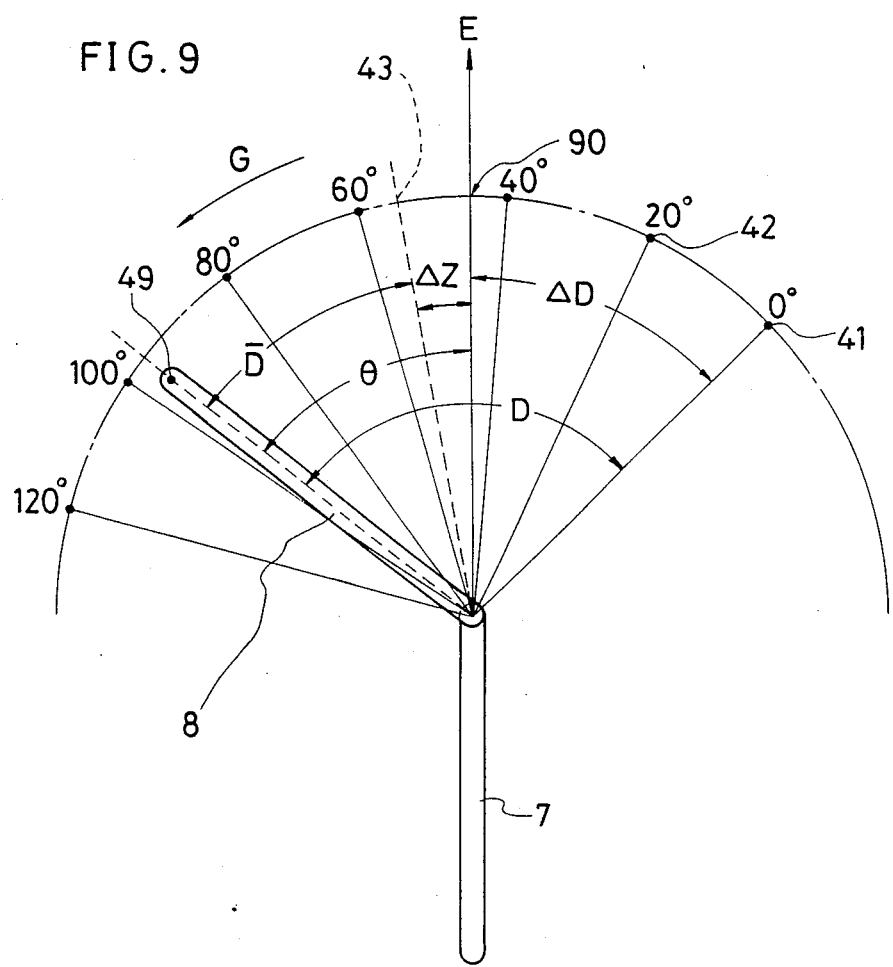
FIG. 9 is a plan view showing movement of the second arm.

First, the arm 8 as shown in FIG. 9, is rotated until a Z-signal is generated from the INC encoder, and is stopped at a position 49 in which the Z-signal is detected (step 1). Then, the detected angle D of the ABS encoder 9 is read (95° in the example) (step 2).

An angle $\bar{D}$ between the Z-signal generating position 43 which is contiguous to the original position 90 and the present position 49 of the arm 8 is calculated by the equation (3) (step 3):

$$\overline{D} = D - (\Delta D + \Delta Z) \quad (3)$$

In the example, since the angle D is 95°, and the angles ΔD and ΔZ are 45° and 10°, respectively, the angle $\overline{D}$ is 40° (95° − (45° + 10°) = 40°).

A turned angle $\overline{\theta}$ of the arm 11 corresponding to the angle $\overline{D}$ of 40° is selected on the basis of the Table 1 (step 5) (40° in the example). The angle $\overline{\theta}$ is added to the angle ΔZ (step 6) (40° + 10° = 50°). Thus, the angle θ (50° in the example) between the original position 90 and the arm 8 is detected.

In case that the arm 8 is present between the original position 41 of the ABS encoder and the Z-signal generating position 43, the value of the angle $\overline{D}$ is negative. In this case, value DM of 360° is added to the angle $\overline{D}$ (step 4).

As mentioned above, in the original position detecting method of the present invention, an absolute position of the arm 8 is detected by rotating the arm 8 within the range of 20° at the most. Then data for controlling the arm is initialized in the control apparatus 20 on the basis of the data of the detected absolute position of the arm 8. Thus, the return-to-origin operation of the arm 8 is accomplished.

In the embodiment, in case that the original position 43 of the INC encoder 12 is present between the original position 90 of the arm 8 and the original position 41 of the ABS encoder 9, namely, when the angle ΔZ is negative value (ΔZ < 0), the following equation (3A) is used instead of the equation (3):

$$\overline{D} = D - (\Delta D - \Delta Z) \quad (3A).$$

As mentioned above, according to the present invention, the return-to-origin operation is completed by rotating the arm by 20° at the most which is a revolution angle corresponding to one revolution of the driving motor of the robot arm, thus the return-to-origin operation is efficiently accomplished. Furthermore, a space required to the return-to-origin operation wherein the arm is moved is restricted within a narrow range, and thus effective availability of the space may be expected.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. Method for detecting original position of a robot arm comprising the steps of:
   detecting a first value of dislocation between an original position of said robot arm and an original position of an absolute position detecting means,
   detecting a second value of dislocation between said original position of said robot arm and a position whereat a signal is output every one revolution of a rotary encoder of incremental type,
   moving said robot arm to a position whereat a signal is output every one revolution of said rotary encoder of incremental type,
   reading an absolute position of the arm by said absolute position detecting means,
   calculating a difference between said detected value of said absolute position detecting means and a sum of said first value of dislocation and said second value of dislocation,
   calculating a value representing a position of said arm corresponding to the value of said difference on the basis of a predetermined relation, and
   calculating an absolute position of said arm by summing said value representing the position of said arm and said second value of dislocation.

2. Method for detecting an original position of a robot arm which is pivotally mounted at one end thereof comprising the steps of:
   detecting a first angle between an original position of said robot arm and an original position of an absolute position detecting means for detecting the absolute position of the robot arm,
   detecting a second angle between said original position of said robot arm and a position in which a Z-signal which is generated at a predetermined revolution angle of a rotary encoder of incremental type for detecting incremental position of the robot arm is output,
   moving said robot arm to a position wherein a Z-signal is output,
   detecting an absolute position of said robot arm by said absolute position detecting means,
   calculating a difference between said detected value of said absolute position detecting means and a sum of said first angle and said second angle,
   calculating an angle representing the position of said robot arm corresponding to the angle of said difference on the basis of a predetermined relation, and
   caluclating an absolute position of said robot arm by summing said angle respresenting the position of said arm and said second angle.

3. Method for detecting an original position of a robot arm in accordance with claim 1 or 2, wherein
   the step of calculating an angle representing the position of said arm corresponding to the angle of said difference on the basis of a predetermined relation further comprises a step of forming a table representing said predetermined relation.

* * * * *